United States Patent Office 3,437,720
Patented Apr. 8, 1969

3,437,720
CARBOXYLATED HYDROXY PHOSPHITES
Alvin Guttag, Bethesda, Md., assignor to Weston Chemical Corporation, New York, N.Y., a corporation of New Jersey
No Drawing. Filed Aug. 3, 1966, Ser. No. 569,817
Int. Cl. C07d *105/04;* C08f *45/58*
U.S. Cl. 260—927
9 Claims

ABSTRACT OF THE DISCLOSURE

There are prepared compounds having the formula

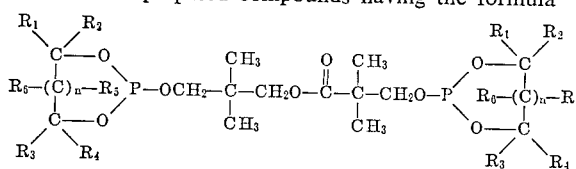

where $n$ is 0 or 1 and $R_1$, $R_2$, $R_3$, $R_4$, $R_5$ and $R_6$ are hydrogen or lower alkyl. The products are useful as stabilizers for polymers.

---

The present invention relates to novel heterocyclic phosphites.

It is an object of the present invention to prepare novel heterocyclic phosphites.

Another object is to prepare heterocyclic phosphite esters having unusually good thermal stability.

A further object is to prepare heterocyclic phosphites which have excellent resistance to hydrolysis.

Yet another object is to impart improved stability to polymers.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing heterocyclic phosphites having the formula

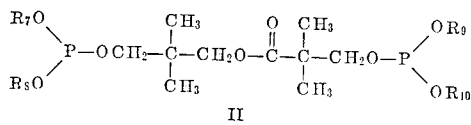

(I)

where $n$ is 0 or 1 and $R_1$, $R_2$, $R_3$, $R_4$, $R_5$ and $R_6$ are hydrogen or lower alkyl, e.g. methyl, ethyl, propyl, butyl, isopropyl, or sec. butyl.

Preferably $n$ is 1 and $R_5$ and $R_6$ are lower alkyl since it has been found that compounds most resistant to hydrolysis are those having a six membered ring and in which the middle carbon atom is a neo carbon atom, i.e. it is attached to four carbon atoms.

The compounds of the present invention within Formula I are conveniently prepared by reacting 2 moles of the appropriate glycol with 1 mole of a compound having the formula

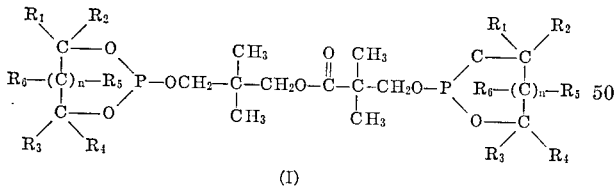

II where $R_7$, $R_8$, $R_9$ and $R_{10}$ are alkyl, aryl or haloaryl. The starting compounds of Formula II are disclosed and claimed in Larrison application Ser. No. 471,711 filed July 13, 1965, now Patent 3,383,436. They are prepared as shown in that application by reacting 1 mole of Ester diol 204 (also called 2,2-dimethyl-3-hydroxypropyl 2,2-dimethyl-3-hydroxypropionate) with 2 moles of trialkyl phosphite, triaryl phosphite or trihaloaryl phosphite.

To prepare the products of Formula I it is critical that there be employed at least two moles of the glycol per mole of the compound of Formula II. Excess glycol can be added to replace any which may distill over with the phenol or alkanol during the reaction. However, significantly less than 2 moles of glycol (e.g. 1.5 moles or 1 mole) per mole of compound of Formula II should not be used since in such case the compounds of the present invention are not formed but instead there are produced complex polymers. Such polymers are not as hydrolytically stable as the products of the present invention (although they also are stabilizers for vinyl chloride resins).

The compounds of the present invention are 1,3,2-dioxaphospholanes or 1,3,2-dioxaphosphorinanes (depending on whether they have 5 or 6 membered rings) having the rings connected by the neo carboxylate grouping. In the present specification and claims for convenience the term neo carboxylate has been coined for the grouping

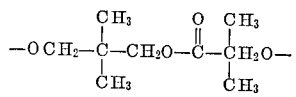

Also for ease in nomenclature the compounds within Formula I are named as derivatives of the glycol. Thus the product within Formula I prepared by reacting 2 moles of ethylene glycol with 1 mole of tetraphenyl neo carboxylate diphosphite and removing four moles of phenol is called neo carboxylate bis (ethylene phosphite).

Other compounds within the present invention within Formula I are neo carboxylate bis (trimethylene phosphite), neo carboxylate bis (neopentylene phosphite), neo carboxylate bis (neohexylene phosphite), neo carboxylate bis (1,2-propylene phosphite), neo carboxylate bis (1,3-butylene phosphite), neo carboxylate bis (1,2-butylene phosphite), neo carboxylate bis (2,3-butylene phosphite), neo carboxylate bis (1,2-pentylene phosphite), neo carboxylate bis (2-ethyl-1,3-hexylene phosphite), neo carboxylate bis (2,4-pentylene phosphite), neo carboxylate bis (2-methyl-1,3-pentylene phosphite), neo carboxylate bis (2,4-heptylene phosphite), neo carboxylate bis (2,2-diethyl-1,3-propylene phosphite), neo carboxylate bis (2-ethyl-2-n-butyl-1,3-propylene phosphite), neo carboxylate bis (2-methyl-2,4-pentylene phosphite), neo carboxylate bis (2-propyl-2-n-butyl-1,3-propylene diphosphite).

As starting compounds within Formula II there can be used tetraphenyl neo carboxylate diphosphite, tetra isodecyl neo carboxylate diphosphite, diphenyl diisodecyl neo carboxylate diphosphite, tetramethyl neo carboxylate diphosphite, tetra decyl neo carboxylate diphosphite, tetra p-cresyl neo carboxylate diphosphite, tetra p-chlorophenyl neo carboxylate diphosphite, tetrakis t-octylphenyl neo carboxylate diphosphite.

As starting glycols there can be employed ethylene glycol, propylene glycol, neopentylene glycol, neohexylene glycol (2-methyl-2-ethyl-1,3-propanediol), trimethylene glycol, 1,3-butylene glycol, 1,2-butylene glycol, 2,3-butylene glycol, 1,2-pentanediol, 2-ethyl-1,3-hexanediol, 2,4-pentylene glycol, 2-methyl-1,3-pentylene glycol, 2,4-heptanediol, 2,2-diethyl-1,3-propanediol (2,2-diethyl-1,3-propylene glycol), 2 - ethyl - 2-n-butyl-1,3-propanediol, 2-methyl-2,4-pentanediol (hexylene glycol), 2-propyl-2-butyl-1,3-propanediol.

The compounds of the present invention can also be prepared by a second procedure which involves reacting 1 mole of Ester diol 204 with 2 moles of the appropriate glycol and 2 moles of a phosphite having the formula

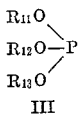

III where $R_{11}$, $R_{12}$ and $R_{13}$ are alkyl, aryl or haloaryl. The proportions are somewhat critical in this second procedure since if more than two moles of glycol are employed per mole of Ester diol 204 there is a tendency to form polymers. Also if more than 1 mole of glycol is employed per mole of trialkyl or triaryl or trihaloaryl phosphite there is a tendency to form polymers rather than the desired heterocyclic compounds. If too little glycol is used there are formed complex mixtures of products. Complex products are also obtained if the amount of phosphite of Formula III is varied from the proportions indicated.

In this second procedure the compound of Formula III can be triphenyl phosphite, trimethyl phosphite, triethyl phosphite, tripropyl phosphite, triamyl phosphite, tris octyl phosphite, tris isodecyl phosphite, tris decyl phosphite, tri-o-cresyl phosphite, tri-p-chlorophenyl phosphite, phenyl diisodecyl phosphite.

Regardless of whether the first or second procedure is employed desirably there is used a catalyst such as a dihydrocarbon phosphite or dihalohydrocarbon phosphite or an alkaline catalyst in an amount of 0.01–5% by weight of the phosphite reactant. Thus as catalysts there can be used dialkyl and diaryl phosphites such as diphenyl phosphite, di-o-cresyl phosphite, di-p-cresyl phosphite, di decyl phosphite, diisodecyl phosphite, dimethyl phosphite, diethyl phosphite or dihalohydrocarbyl phosphites such as di-p-chlorophenyl phosphite or alkaline catalysts such as sodium phenolate, sodium methylate, sodium ethylate, sodium cresylate, potassium phenolate, sodium isodecylate, sodium salt of ethylene glycol, sodium salt of neopentylene glycol. The alkaline catalysts preferably have a pH of at least 11 in a 0.1 N solution.

The compounds of the present invention are viscous liquids or in some cases are solid at room temperature. Regardless of the physical form the compounds have the same uses.

The phosphites of the present invention have excellent stability to heat and light and against hydrolysis. In this respect the six membered ring products are superior to the five membered ring products. The six membered ring products in which the number 5 carbon atom of the ring is a neo carbon atom in particular have outstanding stability and are the most preferred products of the invention. Compounds of this preferred type for example are those derived from neopentylene glycol, neohexylene glycol, 2-propyl-2-butyl-1,3-propanediol and 2,2-diethyl-1,3-propanediol.

Unless otherwise indicated all parts and percentages are by weight.

The compounds of the present invention are useful as heat and light stabilizers for polyvinyl chloride and other vinyl chloride polymers, e.g. vinyl chloride-vinylidene chloride copolymer (80:20), vinyl chloride-vinyl acetate (87:13), vinyl chloride-acrylonitrile (75:25). They also are stabilizers for monoolefin polymers such as polyethylene, polypropylene, ethylene-propylene copolymers (e.g. 50:50, 80:20 and 20:80), ethylene-monoolefin copolymers wherein the monoolefin has 4–10 carbon atoms and is present in a minor amount, e.g. ethylene-butene-1 copolymer (95:5) and ethylene-decane-1 copolymer (90:10). Furthermore they can be used to stabilize natural rubber, styrene-butadiene rubber (SBR rubber) e.g. (75% butadiene, 25% styrene), ethylene-propylene terpolymers, e.g. ethylene-propylene-nonconjugated polyene terpolymers such as ethylene-propylene-dicyclopentadiene (55:42:3), ethylene-propylene-norbornene, and ethylene-propylene-cyclooctadiene, polybutadiene and poly cis isoprene. Also they are stabilizers for polyesters, e.g. styrene modified diethylene glycol adipate-maleate.

The compounds of the present invention are normally employed in an amount of 0.25% to 10% by weight of the polymer they are intended to stabilize. Thus there can be used 1% of the compound of Example 1 infra as a stabilizer with rigid polyvinyl chloride or with polyvinyl chloride plasticized with dioctyl phthalate (40 parts dioctyl phthalate to 60 parts vinyl chloride resin).

Similarly 1 part of the product of Example 1 can be used with 100 parts of polypropylene or 100 parts of natural rubber or cis isoprene rubber or SBR rubber.

When the compounds of the present invention are employed as stabilizers there can be included in the composition conventional additives such as barium-cadmium laurate, epoxidized soya bean oil, dilauryl thiodipropionate, etc.

Example 1

A mixture of 1 mole (636 grams) of tetraphenyl neo carboxylate diphosphite (prepared as set forth in Example 1 of Larrison application 471,711 filed July 13, 1965), 2 moles of neopentylene glycol (204 grams) and 15 grams of diphenyl phosphite as a catalyst were heated at 120–140° C. at 15 mm. Hg pressure. The phenol formed in the reaction was removed by distillation. A total of about 376 grams of phenol was removed. The reaction was completed by heating at 150° C. at 1–2 mm. pressure. The residue in the pot was treated with 7 grams of soda ash, 10 grams of attapulgus clay and 10 grams of filter aid (Hi-Flo) and filtered hot to yield neo carboxylate bis (neopentylene phosphite) as a colorless liquid in a yield of 464 grams and having the formula

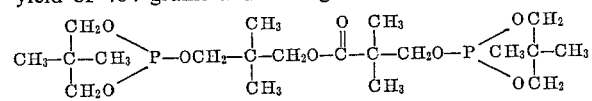

Example 2

A mixture of 1 mole tetraphenyl neo carboxylate diphosphite, 2 moles of neo hexylene glycol and 10 grams of sodium phenate were heated to 120–140° C. at 15 mm. Hg pressure. The phenol formed in the reaction was removed by distillation. The reaction was completed by lowering the pressure to 2–3 mm. A total of about 375 grams of phenol was removed. The residue in the pot was treated with filter-aid (Hi-Flo) and attapulgus clay (Attagel) and filtered hot to yield neo carboxylate bis (neohexylene phosphite) as a viscous liquid in almost quantitative yield.

Example 3

A mixture of 1 mole of tetraamyl neo carboxylate diphosphite (prepared from triamyl phosphite and Ester diol 204 using the type of procedure employed in Larrison application 471,711), 2 moles of propylene glycol and 10 grams of sodium amylate were heated to 110–130° C. and the pressure reduced until the amyl alcohol distilled. Terminal distillation conditions were 5 mm. Hg. Approximately 355 grams of amyl alcohol were removed. The residue in the pot was purified as in Example 2 and filtered hot to yield neo carboxylate bis (1,2-propylene phosphite) as a colorless liquid in substantially quantitative yield.

Example 4

A mixture of 1 mole of tetraphenyl neo carboxylate diphosphite, 2.10 moles of ethylene glycol and 15 grams of diphenyl phosphite were heated at 120–140° C. at 15 mm. Hg pressure. The phenol formed in the reaction was removed by distillation as was the slight excess of ethylene glycol. Terminal distillation conditions were 2–3 mm. Hg. Approximately 375 grams of phenol were removed together with 6 grams of ethylene glycol. The residue in the pot was purified as in Example 1 and filtered hot to yield neo carboxylate bis (neopentylene phosphite) as a liquid.

Example 5

A mixture of 1 mole of tetraamyl neo carboxylate diphosphite, 2 moles of trimethylene glycol and 10 grams of sodium amylate were heated to 110–130° C. and the pressure reduced until the amyl alcohol distilled. Approximately 355 grams of amyl alcohol were recovered. The residue in the pot was purified as in Example 2 and filtered hot to yield neo carboxylate bis (trimethylene phosphite) as a viscous liquid.

What is claimed is:

1. A compound having the formula

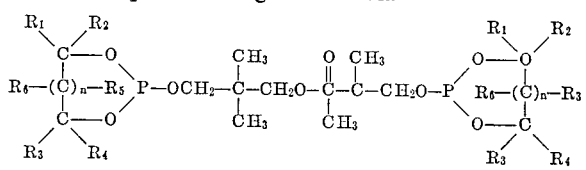

where $n$ is 0 or 1 and $R_1$, $R_2$, $R_3$, $R_4$, $R_5$ and $R_6$ are hydrogen or lower alkyl.

2. A compound according to claim 1 wherein $n$ is 0.
3. A compound according to claim 2 wherein $R_1$, $R_2$, $R_3$ and $R_4$ are hydrogen.
4. A compound according to claim 2 wherein $R_1$ is methyl and $R_2$, $R_3$ and $R_4$ are hydrogen.
5. A compound according to claim 1 wherein $n$ is 1.
6. A compound according to claim 5 wherein $R_5$ and $R_6$ are lower alkyl.

7. A compound having the formula

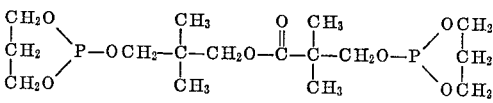

8. A compound having the formula

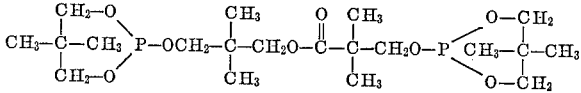

9. A compound having the formula

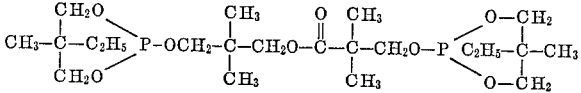

References Cited

UNITED STATES PATENTS 3,283,037  11/1966  Davis _____ 260—927

FOREIGN PATENTS 1,384,809  11/1964  France.

CHARLES B. PARKER, *Primary Examiner.*

R. L. RAYMOND, *Assistant Examiner.*

U.S. Cl. X.R.

260—928, 635, 45.85